US010599996B2

(12) United States Patent
Bose et al.

(10) Patent No.: US 10,599,996 B2
(45) Date of Patent: Mar. 24, 2020

(54) COGNITIVE COMPUTING FOR SERVERS AND MOBILE DEVICES

(71) Applicant: International Business Machines Corporation, Armonk, NY (US)

(72) Inventors: Pradip Bose, Yorktown Heights, NY (US); Alper Buyuktosunoglu, White Plains, NY (US); Augusto Javier Vega, Astoria, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 894 days.

(21) Appl. No.: 15/223,268

(22) Filed: Jul. 29, 2016

(65) Prior Publication Data
US 2018/0025281 A1 Jan. 25, 2018

Related U.S. Application Data

(63) Continuation of application No. 15/214,092, filed on Jul. 19, 2016.

(51) Int. Cl.
*G06N 20/00* (2019.01)
*G06N 5/04* (2006.01)

(52) U.S. Cl.
CPC .......... *G06N 20/00* (2019.01); *G06N 5/04* (2013.01)

(58) Field of Classification Search
None
See application file for complete search history.

(56) References Cited

U.S. PATENT DOCUMENTS

| 8,316,364 | B2 | 11/2012 | Stein |
| 8,694,578 | B2 | 4/2014 | Sapek |
| 9,210,040 | B2 | 12/2015 | Mikkilineni |
| 9,234,744 | B2 | 1/2016 | Rhoads et al. |
| 9,330,257 | B2 | 5/2016 | Valencia et al. |
| 10,410,440 | B2 * | 9/2019 | Remboski ......... B60W 50/0097 |
| 2013/0066815 | A1 | 3/2013 | Oka et al. |
| 2013/0304677 | A1 | 11/2013 | Gupta et al. |
| 2015/0294216 | A1 | 10/2015 | Baughman et al. |
| 2015/0343306 | A1 | 12/2015 | Bentdahl |

FOREIGN PATENT DOCUMENTS

CN 102404387 B 12/2015

OTHER PUBLICATIONS

"IBM, Softbank Alliance to Bring Watson to All of Japan", IBM News Room, Oct. 15, 2015, accessed Apr. 21, 2016, 3 pages.
(Continued)

*Primary Examiner* — Stanley K. Hill
(74) *Attorney, Agent, or Firm* — Amin, Turocy & Watson, LLP

(57) ABSTRACT

Techniques for implementing a safety protocol are provided. In one example, a system is provided that can execute a machine-learned model to determine cognitive data representing a prediction about a state of an environment and an action to be performed in response to the prediction. The system can determine that a connection with a remote device is unavailable, and in response activate a safety protocol.

20 Claims, 15 Drawing Sheets

(56) References Cited

OTHER PUBLICATIONS

Lin et al., "Mobile App Acceleration via Fine-Grain Offloading to the Cloud", USENIX 6th HotCloud, 2014, accessed Apr. 28, 2016, 20 pages.
Chun et al., "Dynamically Partitioning Applications between Weak Devices and Clouds", MCS '10, ACM, 2010, 5 pages, retrieved Apr. 28, 2016.
Cochez et al., "Evolutionary Cloud of Cooperative UAV Coordination," Reports of the Department of Mathematical Information Technology, Series C. Software and Computational Engineering, May 2014, No. C Jan. 2014, accessed Apr. 28, 2016, 23 pages.
Angin et al., "Real-Time Mobile-Cloud Computing for Context-Aware Blind Navigation," International Journal of Next-Generation Computing, Jul. 2011, vol. 2, No. 2, 13 pages.
Soyata et al., "Cloud-Vision: Real-time Face Recognition Using a Mobile-Cloudlet-Cloud Acceleration Architecture," IEEE, 2012, pp. 59-65.
Agribotix-Cloud-Based Image Stitching, http://agribotix.com/image-processing-services/, Feb. 1, 2015 retrieved from Wayback Machine, https://web.archive.org/web/20150201062729/http://agribotix.com/image-processing-services/, 2 pages.
Ayad et al., "Real-time Mobile Cloud Computing: A Case Study in Face Recognition," 28th International Conference on Advanced Information Networking and Applications Workshops, 2014, 6 pages.
Ha, et al., "Towards Wearable Cognitive Assistance," ACM, MobiSys'14, Jun. 16-19, 2014, 14 pages.
Cuervo, et al., "MAUI: Making Smartphones Last Longer with Code Offload," MobiSys'10, Jun. 15-18, 2010, 14 pages.
Gordon, et al., "COMET: Code Offload by Migrating Execution Transparently," 10th USENIX Symposium on Operating Systems Design and Implementation (OSDI '12), 2012, USENIX Association, pp. 93-106.
Ra, et al., "Odessa: enabling interactive perception applications on mobile devices," MobiSys'11, Jun. 28-Jul. 1, 2011, 14 pages.
Mel, et al., "The NIST Definition of Cloud Computing," Recommendations of the National Institute of Standards and Technology, Sep. 2011, 7 pages.
Non-Final Office Action received for U.S. Appl. No. 15/214,092 dated Oct. 30, 2019, 55 pages.
Miluzzo et al., "Darwin Phones: the Evolution of Sensing and Inference on Mobile Phones", ACM; MobiSys'10, 2010, pp. 5-20.

* cited by examiner

COGNITIVE COMPUTING FOR SERVERS AND MOBILE DEVICES

STATEMENT REGARDING FEDERALLY SPONSORED RESEARCH OR DEVELOPMENT

This invention was made with Government support under Contract No.: HR0011-13-C-0022 awarded by Defense Advanced Research Projects Agency (DARPA). The Government has certain rights in this invention.

BACKGROUND

The subject disclosure relates to cognitive computing, and more specifically, to cognitive computing for servers and mobile devices.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate synchronization of processing components for parallel deep learning are described.

According to an embodiment of the present invention, a first system can comprise a memory that stores computer executable components and a processor that executes computer executable components stored in the memory. The computer executable components can comprise a communication component that receives context data. The context data can be received from a first device. The context data can be or comprise extrinsic data monitored by a sensor device. The computer executable components can comprise a cognitive server component that can determine first model data. Determination of the first model data can be based on a machine-learning analysis of the context data. The first model data can be or comprise an artificial intelligence-based model trained to interpret the context data. The communication component can transmit the first model data to the first device. In some embodiments, elements described in connection with the system can be embodied in different forms such as a computer-implemented method, a computer program product, or another form.

According to another embodiment, a system can comprise a memory that stores computer executable components and a processor that executes computer executable components stored in the memory. The computer executable components can comprise a cognitive agent component that determines cognitive data. The cognitive data can be determined based on context data and based on first model data. The context data can represent a state of an environment. The first model data can represent a machine-learned model of interpreting the context data. The cognitive data can comprise prediction data that represents a prediction relating to the state of the environment. The computer executable components can comprise a communication component that can transmit at least a portion of the context data and at least a portion of the cognitive data to a first device. In response to the transmission, the communication component can receive update data comprising second model data that represents an update to the first model data. In some embodiments, elements described in connection with the system can be embodied in different forms such as a computer-implemented method, a computer program product, or another form.

According to another embodiment, a system can comprise a memory that stores computer executable components and a processor that executes computer executable components stored in the memory. The computer executable components can comprise a cognitive agent component that determines cognitive data. The cognitive data can be determined based on context data and based on model data. The context data can represent a state of an environment. The model data can represent a machine-learned model of interpreting the context data. The cognitive data can comprise prediction data and action data. The prediction data can be indicative of a prediction relating to the state of the environment. The action data can be indicative of a first action to be performed in response to the prediction. The computer executable components can comprise a communication component that can determine failed connection data that indicates communication with a remote device is unavailable. The computer executable components can comprise a safety component that, in response to the failed connection data, can instruct the cognitive agent component to determine the cognitive data based on a safety protocol. The safety protocol can be included in the model. The safety protocol can be utilized in response to the communication with the remote device being unavailable. In some embodiments, elements described in connection with the system can be embodied in different forms such as a computer-implemented method, a computer program product, or another form.

DETAILED DESCRIPTION

Figure 1:
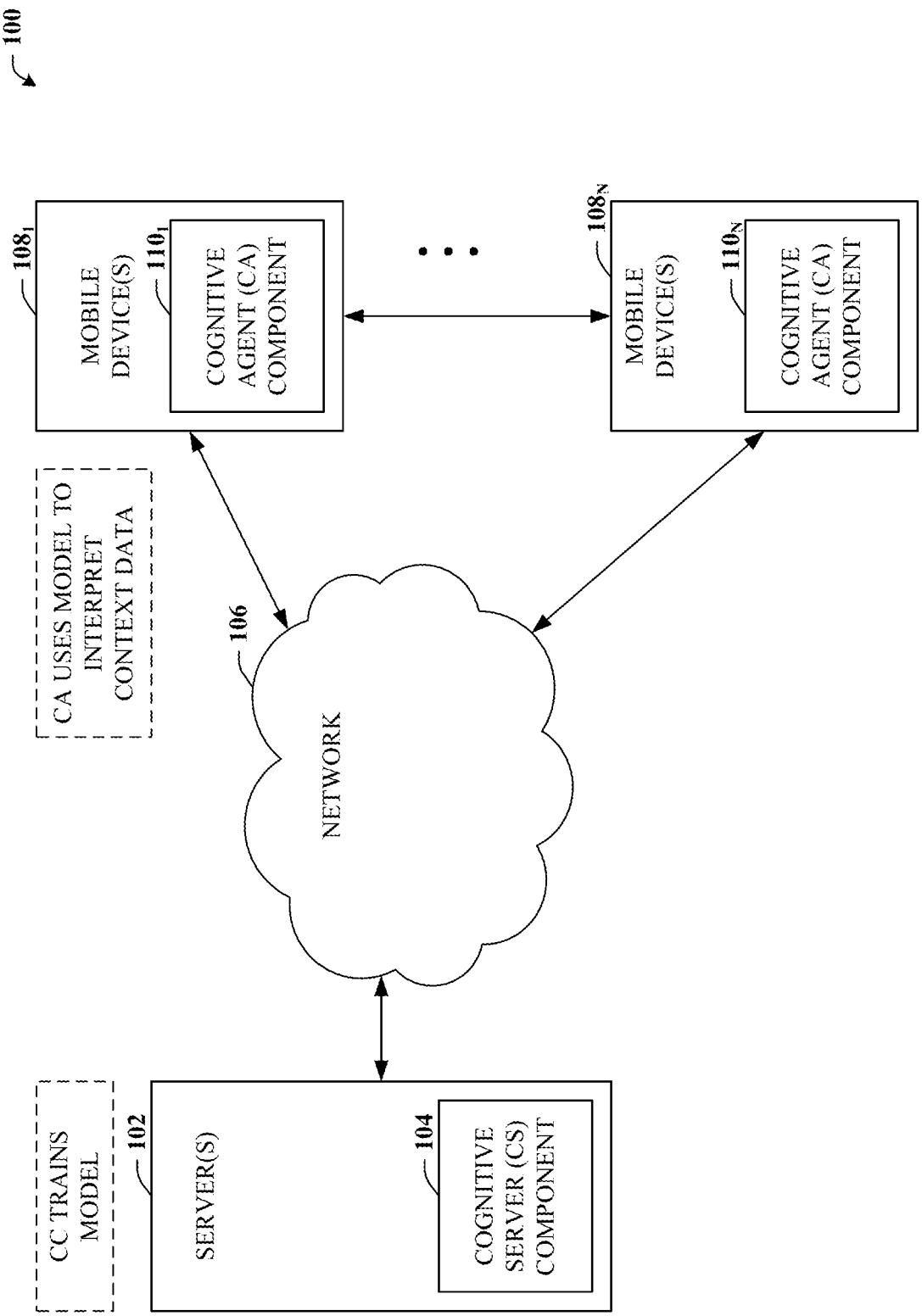
FIG. 1 illustrates a block diagram of an example, non-limiting system that depicts an example architecture illustrating communication with respect to servers and mobile devices in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

In various embodiments described herein, cognitive computing can relate to interpreting contextual information based on a cognitive model that is trained according to machine-learning techniques. Contextual information can be, for example, data obtained or derived from a camera or other sensor device. In some embodiments, for example, a cognitive computing device can examine a video feed from a camera and make various determinations regarding events or environments depicted in the video feed. Such determinations can be, e.g., a prediction, P (e.g., an event is about to take place), a confidence score, C, of the prediction (e.g., 78%), and an action, A (e.g., notify/send alert). In some embodiments, the cognitive computing device can determine a severity score, S, of the action such as, S=8. In this example, C is measured as a percentage measure and S is measured on a severity scale ranging from 1-10, but it is appreciated that any suitable scoring mechanisms or measures can be employed.

Using an appropriate cognitive model, in some embodiments, these determinations (e.g., determinations P, C, A, and S) can be performed in real-time or near real-time with respect to analysis of the contextual information in a manner that does not require a substantial amount of computing resources (e.g., processing, power, memory, etc.). As used herein, the term "real-time" can mean within a defined amount of time (e.g., 5 milliseconds, 10 seconds, etc.). Accordingly, mobile devices such as an unmanned aerial vehicle (UAV) or the like, that typically are resource-constrained to a degree, generally do have sufficient resources to accomplish the above determinations.

The disclosed subject matter relates to a distinct approach of decoupling model training from model execution. For example, the cognitive model can be trained at servers. For instance, a server that comprises an element referred to herein as a "cognitive cloud (CC) component" or a "cognitive server (CS) component" can be used for accurate learning techniques, big data-like techniques, and so forth. The model and/or updates to the cognitive model can be provided to the mobile device. The mobile device can comprise an element referred to herein as a "cognitive agent (CA) component." The mobile device can utilize the model to interpret local context information to generate various determinations (e.g., P, C, A, S) even while a connection with the CS component is unavailable.

In some embodiments, the model can include a safety protocol that can be used to interpret the context data under certain conditions. For example, the safety protocol can be employed when a connection with the CS component is unavailable. As another example, the safety protocol can be employed if C is below a defined confidence threshold and/or S is above a defined severity threshold.

In some embodiments, P, C, A, and/or S, as well as the contextual information can be communicated to the CS component when a connection is available. Thus, the CS component can use the contextual information to generate updates to the model and can verify model-based determinations made by the CA, perhaps based on an updated model or additional information not available to the mobile device.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIG. 1 illustrates a block diagram of an example, non-limiting system 100 that depicts an example architecture illustrating communication with respect to servers and mobile devices. System 100 and/or the components of the system 100 can be employed to use hardware and/or software to solve problems that are highly technical in nature, that are not abstract, and that cannot be performed as a set of mental acts by a human. Further, some of the processes performed can be performed by specialized computers for carrying out defined tasks related to cognitive model training or cognitive model execution subject areas. System 100 and/or components of system 100 or other systems described herein can be employed to solve new problems that arise through advancements in technology, computer networks, the Internet, and the like. The system 100 can provide technical improvements to cognitive model training and execution by decoupling model training, which tends to be a resource-intensive operation, from model execution, which can be performed on devices that receive local context information. In this example, system 100 can include one or more servers 102. A server 102 can comprise cognitive server (CS) component 104. In some embodiments, servers 102 can perform cloud computation and/or provide the cloud computation as part of a cloud service, which is further detailed in connection with FIGS. 13 and 14.

Server 102 can communicate, via a network 106, with some number, N, mobile devices $108_1$-$108_N$, where N is a positive integer. Network 106 can be a wide area network such as the Internet. Mobile devices $108_1$-$108_N$ can comprise a cognitive agent (CA) components $110_1$-$110_N$ that can execute the cognitive model to interpret context data. Mobile devices $108_1$-$108_N$ and CA components $110_1$-$110_N$ are respectively referred to herein either individually or collectively as "mobile device(s) 108" and "CA component(s) 110," with appropriate subscripts generally employed only when instructive or convenient to highlight various distinctions or to better impart the disclosed concepts.

CA component 110 can receive the model trained by CS component 104 and use that model to interpret context data collected by mobile device 108 or one or more sensors associated with mobile device 108. For example, CA component 110 can execute the model to form P, C, A, or S. In some embodiments, mobile device 108 can be an unmanned aerial vehicle (UAV) or another unmanned or manned vehicle. Mobile devices 108 can communicate with one another through network 106 or directly in a point-to-point fashion or the like. For example, mobile device $108_1$ can communicate data (e.g., model data, context data, etc.) to or from mobile device $108_N$.

In some embodiments, the concept of decoupling model training, performed at servers 102, from model execution, performed at mobile devices 108, can provide a more robust cognitive computing implementation. For example, in some embodiments, resource-constrained devices can be provided a cognitive model for which those resource-constrained devices may not be capable of generating, but are capable of executing to interpret certain locally collected context data. In some embodiments, the quality or sophistication of the trained model is not dependent on the resources of the mobile devices 108. On the other hand, in some embodiments, execution of the model, such as determining various actions to perform, can be determined at mobile devices 108 even without having a connection to servers 102. In other words, execution of the model is not reliant on having a persistent or currently available connection between servers 102 and mobile devices 108.

Figure 2:
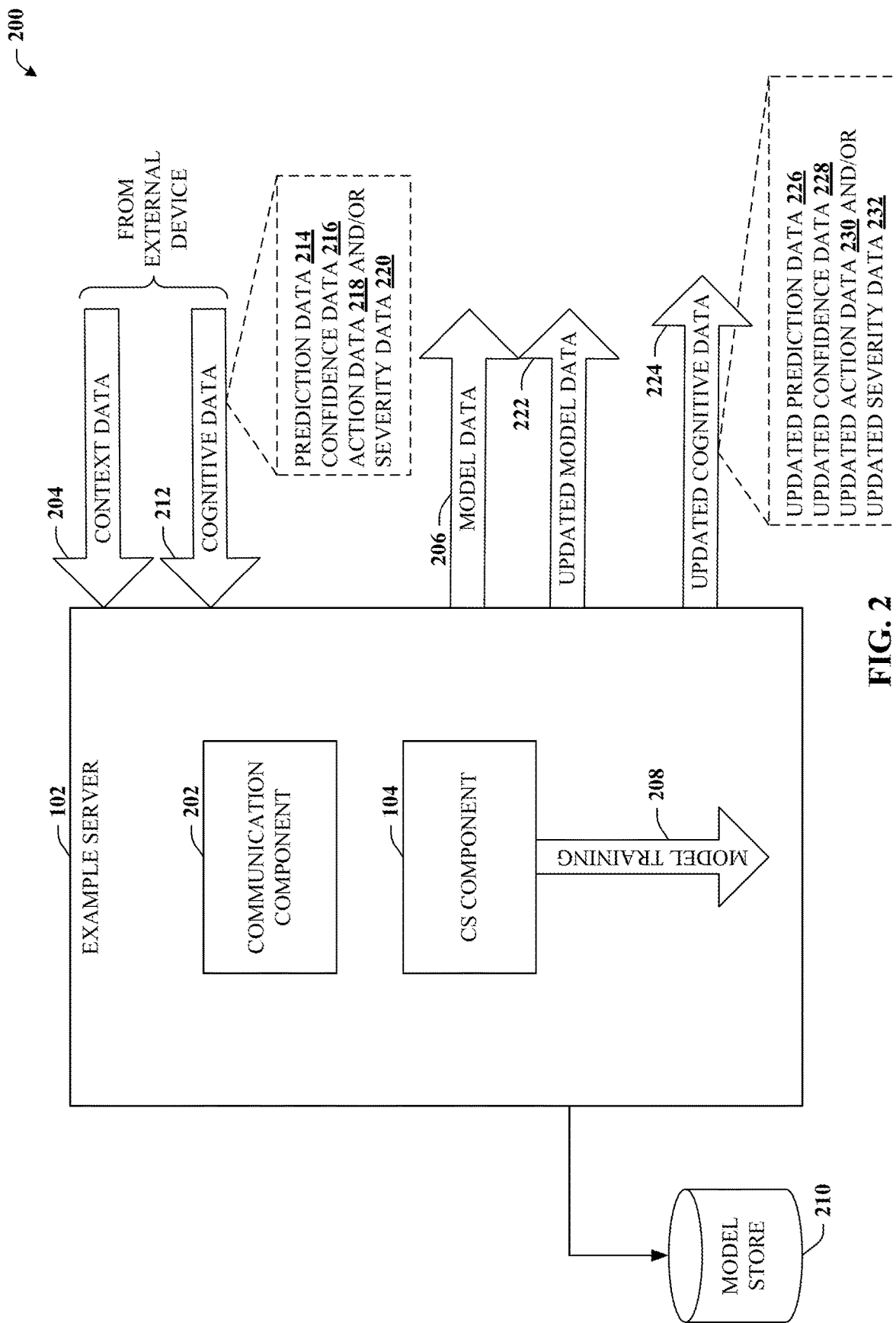
FIG. 2 illustrates a block diagram of an example, non-limiting system comprising an example server in more detail and in accordance with one or more embodiments described herein.

Referring now to FIG. 2, system 200 is depicted. System 200 illustrates an example server in more detail and in accordance with certain embodiments of the disclosed subject matter. Repetitive description of like elements employed in other embodiments described herein is omitted for sake of brevity.

Server 102 can comprise a processor and a memory that stores executable instructions that, when executed by the processor, facilitate performance of operations. Examples of said processor and memory, as well as other suitable computer or computing-based elements, can be found with reference to FIG. 15, and can be used in connection with implementing one or more of the systems or components shown and described in connection with FIG. 2 or other figures disclosed herein.

Server 102 can comprise a communication component 202 that can receive from a first device (e.g., from an external device shown in FIG. 2) context data 204. The first device can be mobile device 108 as one example. Context data 204 can represent extrinsic data monitored by a sensor device and extrinsic to the server 102. For example, mobile device 108 can include a sensor device or be otherwise associated with a sensor device that collects sensor data. In some embodiments, the sensor data is context data 204. In some embodiments, context data 204 is derived from the sensor data.

In some embodiments, server 102 can comprise CS component 104 that can determine model data 206. Model data 206 can represent an artificial intelligence-based model trained to interpret context data 204. Model data 206 can be trained based on machine-learning analysis of context data 204 or application of training-based algorithms that are exemplified by reference numeral 208 in connection with context data 204. In some embodiments, model data 206 can be saved at model store 210, which can represent an archive for various models. In some embodiments, model data 206 can be transmitted to mobile device 108.

Mobile device 108 can utilize model data 206 to determine cognitive data 212. In some embodiments, cognitive data 212 can be provided to server 102. In some embodiments, server 102 can provide updated model data 222, which can represent an update to a previous or other model being used to derive cognitive data 212 such as model data 206. Thus, server 102 can generate the updated model 222 from the most recent context data 204, potentially from multiple mobile devices 108, and both provide the updated model data 22 and verify cognitive data 212 that was determined based on model data 206 or another model.

In some embodiments, cognitive data 212 can comprise prediction data 214 representing a prediction relating to the extrinsic data. The extrinsic data can be received by mobile device 108. Prediction data 214 can be determined based on model data 206 or updated model data 222. For example, prediction data 214 can relate to techniques associated with object recognition such as an object detected in the environment is a red truck, inference techniques such as inferring behavior associated with objects in the environment (e.g., an event is about to occur, an emergency is about to occur, etc.) or the like. In some embodiments, cognitive data 212 can comprise confidence data 216 representing a determined confidence metric of the prediction. Confidence data 216 can be determined based on model data 206 or updated model data 222. In some embodiments, cognitive data 212 can comprise action data 218 representing an action to be performed in response to the prediction. Action data 218 can be determined based on model data 206 or updated model data 222. In some embodiments, cognitive data 212 can comprise severity data 220, which is further detailed in connection with FIG. 4. Briefly, severity data 220 can be indicative of a determined severity metric associated with the action.

In response to receipt of cognitive data 212 that can be determined by mobile device 108 using model data 206 or a previous model, server 102 and/or CS component 104 can verify cognitive data 212. If verified, server 102 can do nothing or send an indication that cognitive data 212 has been verified and/or authorized. If new model data is available such as updated model data 222 and/or corrections, updates, or authorizations are determined to be appropriate, server 102 can provide updated cognitive data 224. In some embodiments, updated cognitive data 224 can be provided to mobile device 108.

In some embodiments, updated cognitive data 224 can comprise updated prediction data 226 representing an updated prediction relating to the extrinsic data. In some embodiments, updated cognitive data 224 can comprise updated confidence data 228 representing an updated confidence metric of the prediction or the updated prediction. In some embodiments, updated cognitive data 224 can comprise updated action data 230 representing an updated action to be performed in response to the prediction or the updated prediction determined based on the context data 204 and either model data 206 or updated model data 222. In some embodiments, updated cognitive data 224 can comprise updated severity data 232 representing an updated severity metric associated with the action or the updated action.

Figure 3:
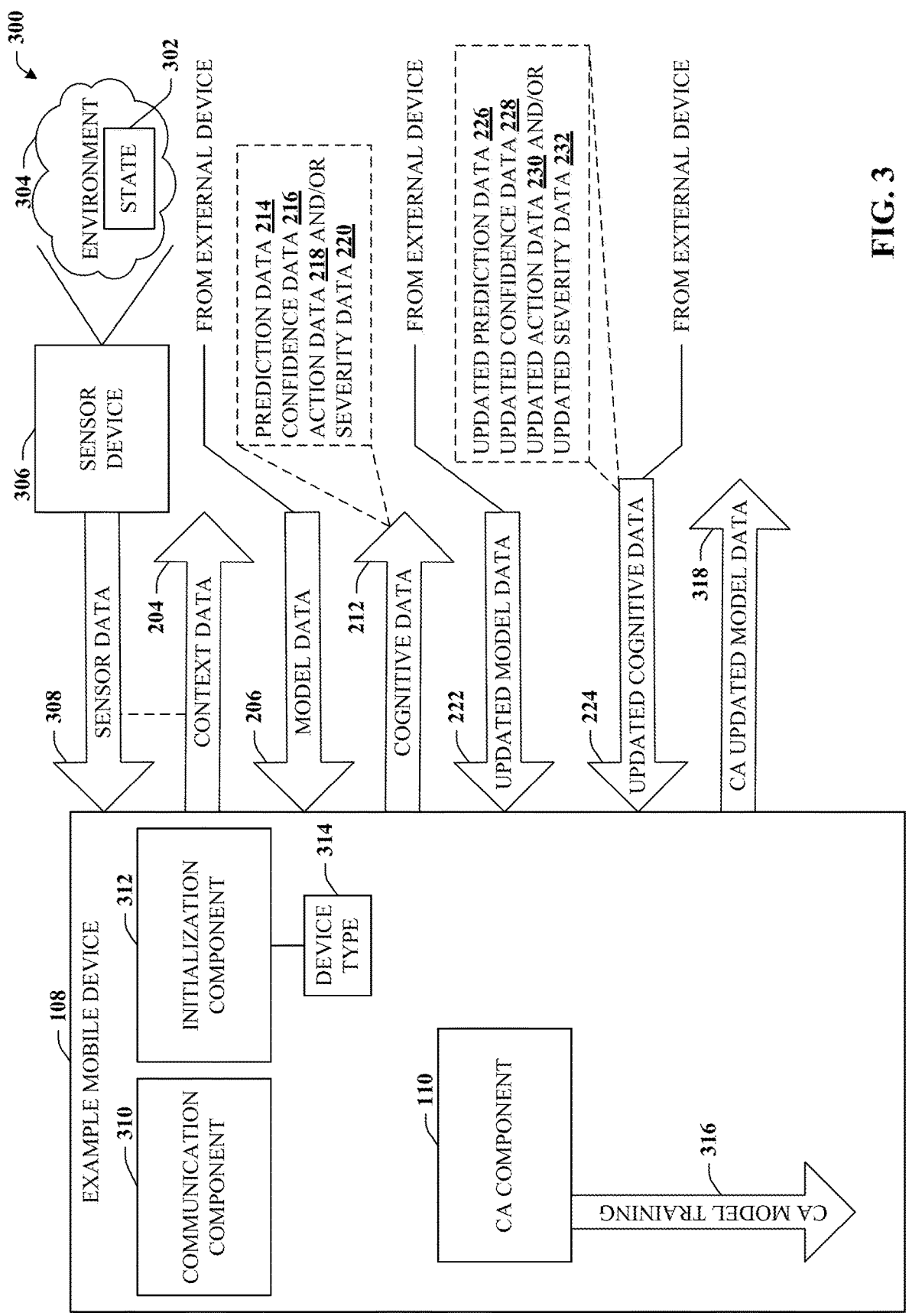
FIG. 3 illustrates a block diagrams of example, non-limiting system comprising an example mobile device in more detail in accordance with one or more embodiments described herein.

Turning now to FIG. 3, system 300 is depicted. System 300 illustrates an example mobile device in more detail and in accordance with certain embodiments of the disclosed subject matter. Repetitive description of like elements employed in other embodiments described herein is omitted for sake of brevity.

Mobile device 108 can comprise or be communicatively coupled to one or more sensor devices 306 that can monitor state 302 of environment 304 such as an environment local to sensor device 306. For example, in some embodiments, sensor device 306 can be a camera device or other imaging device that captures images or other electromagnetic radiation data received from environment 304. Sensor device 306 can be a motion-sensing device that determines motion-based measurements of sensor device 306 or of an object (not shown) in environment 304. Sensor device 306 can be any suitable device that collects sensor data 308 representing a state 302 of environment 304.

Based on sensor data 308, mobile device 108 and/or CA component 110 can determine or derive context data 204. Context data 204 can represent state 302 of environment 304 and can be sensor data 308 in raw form or be derived from sensor data 308 (e.g., a summary of sensor data 308, a formatted version of sensor data 308, etc.). For example, in some embodiments, sensor device 306 can generate context data 204 in response to input received from the environment such as in cases where context data 204 represents raw sensor data 308. In some embodiments, context data 204 can be derived from sensor data 308 by mobile device 108. Mobile device 108 and/or communication component 310 can receive model data 206 that describes a machine-learned model of interpreting context data 204. In some embodiments, model data 206 can be trained by a remote or extrinsic device that has more computational resources than is available at mobile device 108. For example, model data 206 can be trained by server 102.

Based on context data 204 and model data 206, mobile device and/or CA component 110 can determine cognitive data 212 as detailed in connection with FIG. 2. For example, cognitive data 212 can include prediction data 214, confidence data 216, action data 218, and/or severity data 220. All or portions of both context data 204 and cognitive data 212 can be provided to a remote device such as server 102. In response to receiving context data 204, server can use context data 204 to further train updated model data 222, which can be provided to mobile device 108. In some embodiments, updated model data 222 can represent an update to model data 206.

In response to receiving cognitive data 212, server 102 can verify cognitive data 212, and, in some embodiments, provide updated cognitive data 224 detailed in connection with FIG. 2. As detailed, updated cognitive data 224 can comprise updated prediction data 226, updated confidence data 228, updated action data 230, and/or updated severity data 232.

In some embodiments, mobile device 108 can comprise initialization component 312 that can, based on device type 314 that represents a type associated with mobile device 108, receive model data 206. Additional elements relating to initializing mobile device 108 and/or initialization component 312 are further described in connection with FIG. 9.

In some embodiments, certain data such as context data 204 or sensor data 308 can be summarized into mini-panoramas. Such summarization can be due to limited bandwidth or throughput between mobile device 108 and server 102. An example of such is provided in connection with FIG. 10.

In some embodiments, context data 204, model data 206, and/or other data can be propagated between mobile device 108 and server 102, which can be accomplished during times in which mobile device 108 and server 102 are communicatively coupled. During times in which mobile device(s) 108 cannot communicate with server 102, context data 204, model data 206, and/or other data can be propagated between mobile devices 108. For example, a first mobile device 108 can received model data 206 or updated model data 222 from server 102 that cannot connect with a second mobile device 108. Provided the first mobile device 108 can connect to the second mobile device 108, model data 206 or 222 can be delivered to second mobile device 108. Conceptually, in some embodiments, such can enable certain swarm aspects of cognition and data delivery that are further detailed in connection with FIGS. 11 and 12.

While in some embodiments, mobile device 108 can be a resource constrained device relative to potentially more abundant resources (e.g., processing, memory, power) available at server 102, it can still be possible to perform some training at mobile device 108. Hence, in some embodiments, mobile device 108 can comprise element 316 relating to CA training based on machine-learning techniques or principles. In other words, mobile device 108 can determine model data such as CA updated model data 318 based on machine-learning analysis of context data 204. In some embodiments, such CA-based training can not be as robust as model data 206, 222 generated at server 102 due to resource constraints. Yet, such can still provide benefits and/or represent an valid improvement over other models available to mobile device 108. CA updated model data 318 can be utilized to updated model data 206, 222 and can be transmitted to server 102 and/or to other mobile devices 108.

Figure 4:
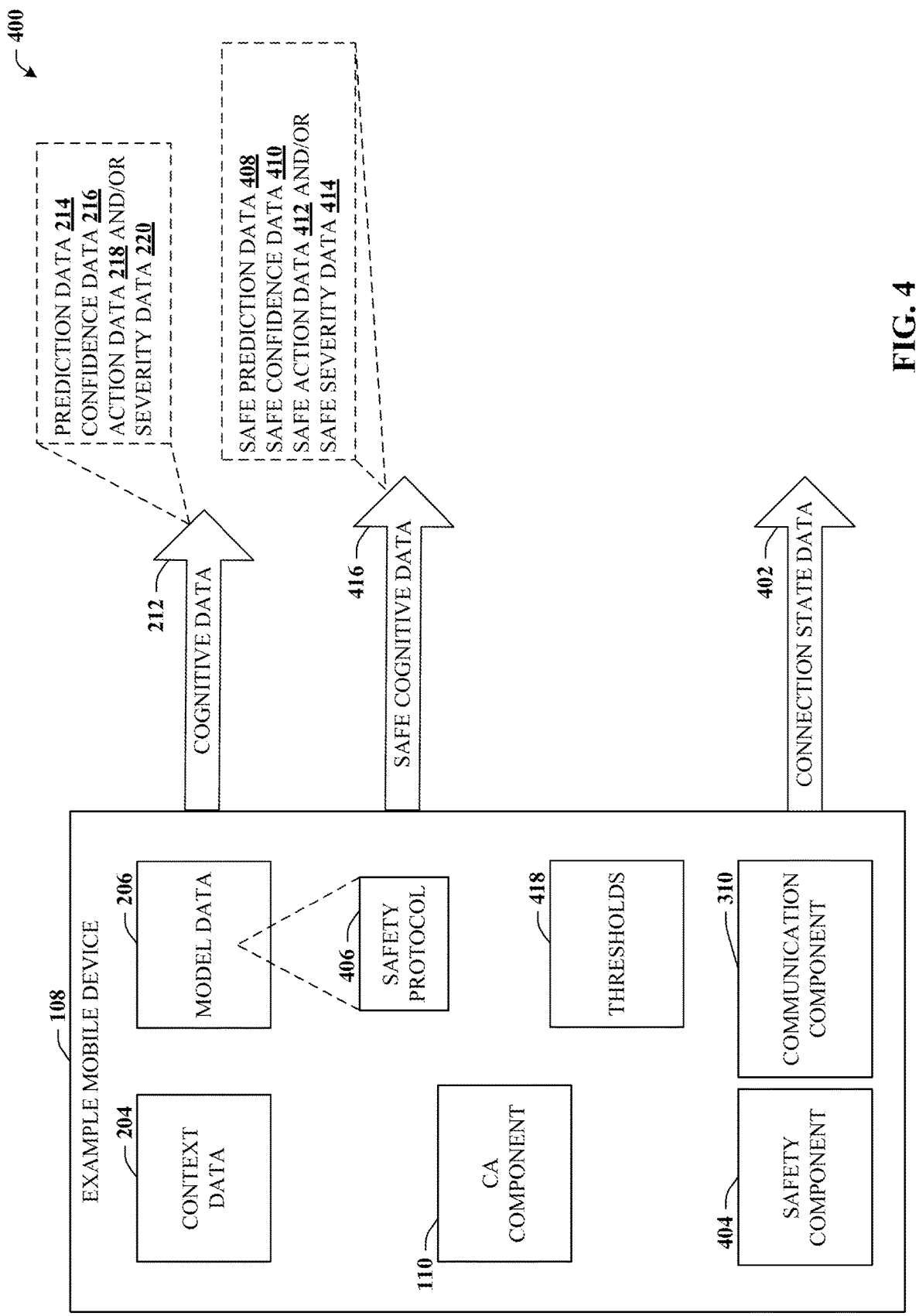
FIG. 4 illustrates a block diagram of an example, non-limiting system that can provide for a safety protocol in connection with model data used to interpret context data in accordance with one or more embodiments described herein.

With reference now to FIG. 4, system 400 is depicted. Repetitive description of like elements employed in other embodiments described herein is omitted for sake of brevity.

System 400 can provide for a safety protocol in connection with model data used to interpret context data. For example, mobile device 108 can comprise context data 204 and model data 206 as substantially described herein. Mobile device 108 can comprise CA component 110 that can, based on context data 204 that represents state 302 of environment and 304 and based on model data 206 indicative of a machine-learned model of interpreting the context data, determine cognitive data 212 comprising prediction data 214 and action data 218. In some embodiments, prediction data 214 is indicative of a prediction relating to the state 302 of the environment 304 and the action data 218 is indicative of a first action to be performed in response to the prediction. In some embodiments, cognitive data 212 can further comprise confidence data 216 and severity data 220 as substantially detailed herein.

In some embodiments, mobile device 108 can comprise communication component 310 as substantially described herein. Communication component 310 can determine connection state data 402. For example, in some embodiments, connection state data 402 can be failed connection data that indicates communication with a remote device such as server 102 is unavailable. In some embodiments, connection state data 402 can be connection data that indicates communication with the remote device is available or has been restored.

Mobile device 108 can further comprise safety component 404 that, in response to the failed connection data, can instruct CA component 110 to determine cognitive data 212 based on safety protocol 406. Safety protocol 406 can represent a portion of model data 206 or can be a separate data entity. Safety protocol 406 can be utilized, for instance, in response to a determination that communication with the remote device such as server 102 is unavailable.

In response to receiving the instruction from safety component 404, CA component 110 can update and/or re-determine cognitive data 212 with safe cognitive data 416 that can be employed in response to the determination that communication with the remote device such as server 102 is unavailable. Safe cognitive data 416 can comprise safe prediction data 408 that can represent a safe prediction determined based on context data 204 and safety protocol 406. Safe cognitive data 416 can comprise safe confidence data 410 that is determined based on context data 204 and safety protocol 406 and can reflect a confidence metric associated with the prediction or the safe prediction. Safe cognitive data 416 can comprise safe action data 412 that is determined based on context data 204 and safety protocol 406 and can represent a safe action to be performed in response to the prediction or the safe prediction. Safe cognitive data 416 can comprise safe severity data 414 that is determined based on context data 204 and safety protocol 406 and can represent a safe severity metric determine for the action or the safe action.

As an illustrative example, suppose mobile device 108 uses model data 206 to analyze context data 204 comprising a video images from a camera. Further suppose, mobile device 108 determines various cognitive data 212, including a prediction that an event is about to take place and this prediction, P, has a confidence score of 78%. Using model data 206, mobile device 108 might then determine that a suitable action, A, is to intervene in some manner or notify certain other entities such as law enforcement entities or protection service entities. Mobile device 108 and/or CA component 110 can further determine a severity associated with the determined action, which can be based on risk factors (e.g., potential harm or damage, chance of incorrect P or false positive, etc.), cost factors, or any other suitable factors. For example, an action, A1 that involves intervening in a manner that might cause harm can be determined to be more severe than action, A2 that relates to collecting additional context data 204. Accordingly, suppose action A1 is determined based on model data 206. Action A2, such as an action to change location and continue observation to increase C or reduce S, can be determined based on safety protocol 406.

Thus, while use of safety protocol 406 can be triggered in response to connection state data 402 indicating no available connection with server 102, safety protocol 406 might also be triggered, additionally or alternatively, based on comparisons with suitable thresholds 418. For example, safety component 404 can, in response to a determination by CA component 110 that the confidence measure does not meet a defined confidence threshold, instruct the cognitive agent component 110 to utilize the safety protocol 406 to determine the cognitive data 212, which is referred to herein as "safe cognitive data 416." In the above example, C=78%, so safe action data 412 can be, e.g., to collect more context data 204 to, for instance, increase C to a level above the confidence threshold of thresholds 418. For example, the confidence threshold can be 95%.

As another example, safety protocol 406 might also be triggered, additionally or alternatively, based on comparisons with a severity threshold of thresholds 418. For example, safety component 404 can, in response to a determination by CA component 110 that the determined severity does not meet a defined severity threshold, instruct the cognitive agent component 110 to utilize the safety protocol 406 to determine the cognitive data 212 such as safe cognitive data 416. In the above example, the severity associated with intervening (A1), might be, S=8, whereas the severity of A2 determined according to safety protocol 406 can be determined to be S=2.

In some embodiments, safety component 404 can, in response to connection state data 402 being determined to indicate a connection with a remote device such as server 102) is available or has been restored, instruct cognitive agent component 110 to generate cognitive data 212 without employing the safety protocol 406.

FIGS. 5-12 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts can occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Figure 5:
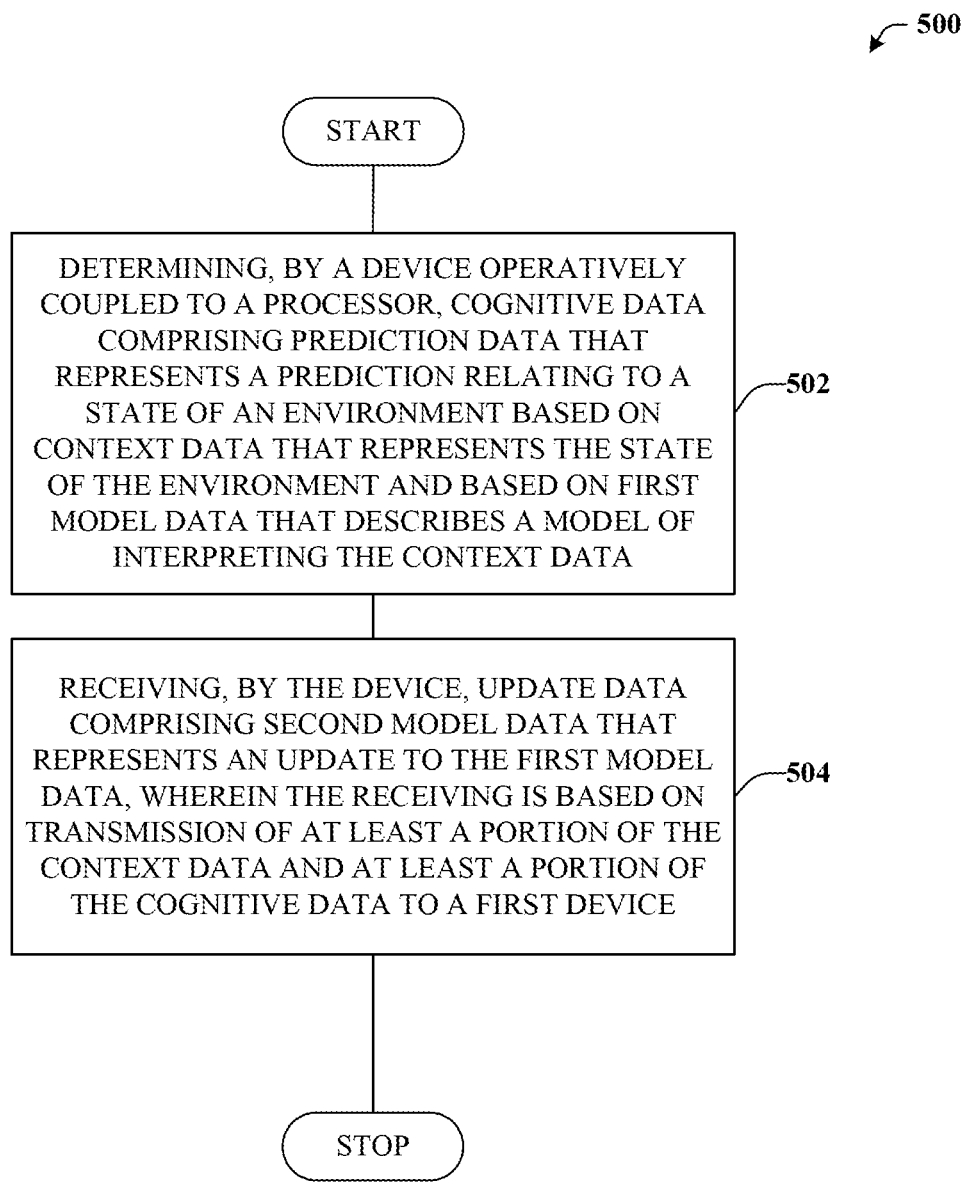
FIG. 5 illustrates a flow diagram of an example, non-limiting computer-implemented method that can provide for cognitive computing elements in connection with decoupling model training from model execution in accordance with one or more embodiments described herein.

Turning now to FIG. 5, illustrated is a flow diagram of an example, non-limiting computer-implemented method 500 that can provide for cognitive computing elements in connection with decoupling model training (e.g., model training 208) from model execution in accordance with one or more embodiments described Repetitive description of like elements employed in other embodiments described herein is omitted for sake of brevity.

At reference numeral 502, a device such as mobile device 108 operatively coupled to a processor can determine cognitive data comprising prediction data that represents a prediction relating to a state of an environment. The cognitive data can be determined based on context data that represents the state of the environment and based on first model data that describes a model of interpreting the context data. In some embodiments, the model can be a machine-learned model and can be trained at a remote device such as server 102. In some embodiments, the model can simulate human reasoning, thinking, and/or determining.

At reference numeral 504, the device can receive update data comprising second model data that represents an update to the first model data. The second model data can be determined based on context data received from the device as well as potentially other devices, such as other devices similar to the device. In some embodiments, the update data can be received in response to a transmission of at least a portion of the context data and at least a portion of the cognitive data to the remote device. In some embodiments, the remote device can employ the context data to further train and/or generate updates to the model data. In some embodiments, the remote device can utilize a larger set of computing resources than is available to the device. In some embodiments, the remote device can employ the context data to verify the cognitive data generated by the device is sufficient or accurate. Method 500 can terminate.

Figure 6:
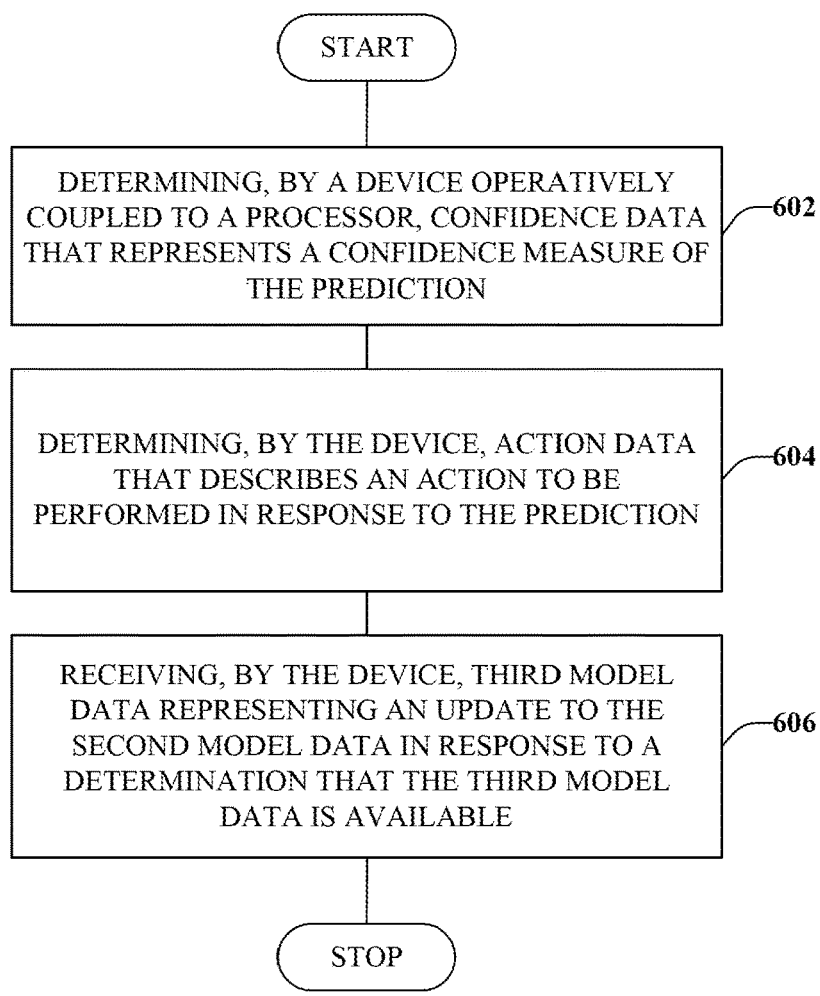
FIG. 6 illustrates a flow diagram of an example, non-limiting computer-implemented method that can provide for additional aspects or elements in connection with cognitive computing elements in accordance with one or more embodiments described herein.

Referring now to FIG. 6, illustrated is a flow diagram of an example, non-limiting computer-implemented method that can provide for additional aspects or elements in connection with cognitive computing elements in accordance with one or more embodiments described herein. Repetitive description of like elements employed in other embodiments described herein is omitted for sake of brevity. At reference numeral 602, the device can determine confidence data that represents a confidence measure of the prediction detailed in connection with reference numeral 502. In some embodiments, the confidence data can be part of the cognitive data. In some embodiments, the device can be mobile device 108.

At reference numeral 604, the device can determine action data that describes an action to be performed in response to the prediction. In some embodiments, the device can determine severity data that describes a severity measure associated with the action. In some embodiments, both action data and severity data can comprise portions of the cognitive data.

At reference numeral 606, the device can receive third model data representing an update to the second model data. The third model data can be determined by the remote device and can be received in response to a determination that the third model data is available. For example, when third model data has been trained by the remote device, previous sets of model data can be identified as outdated or old and devices that use the outdated model data can be identified for receipt of the updated model data.

Figure 7:
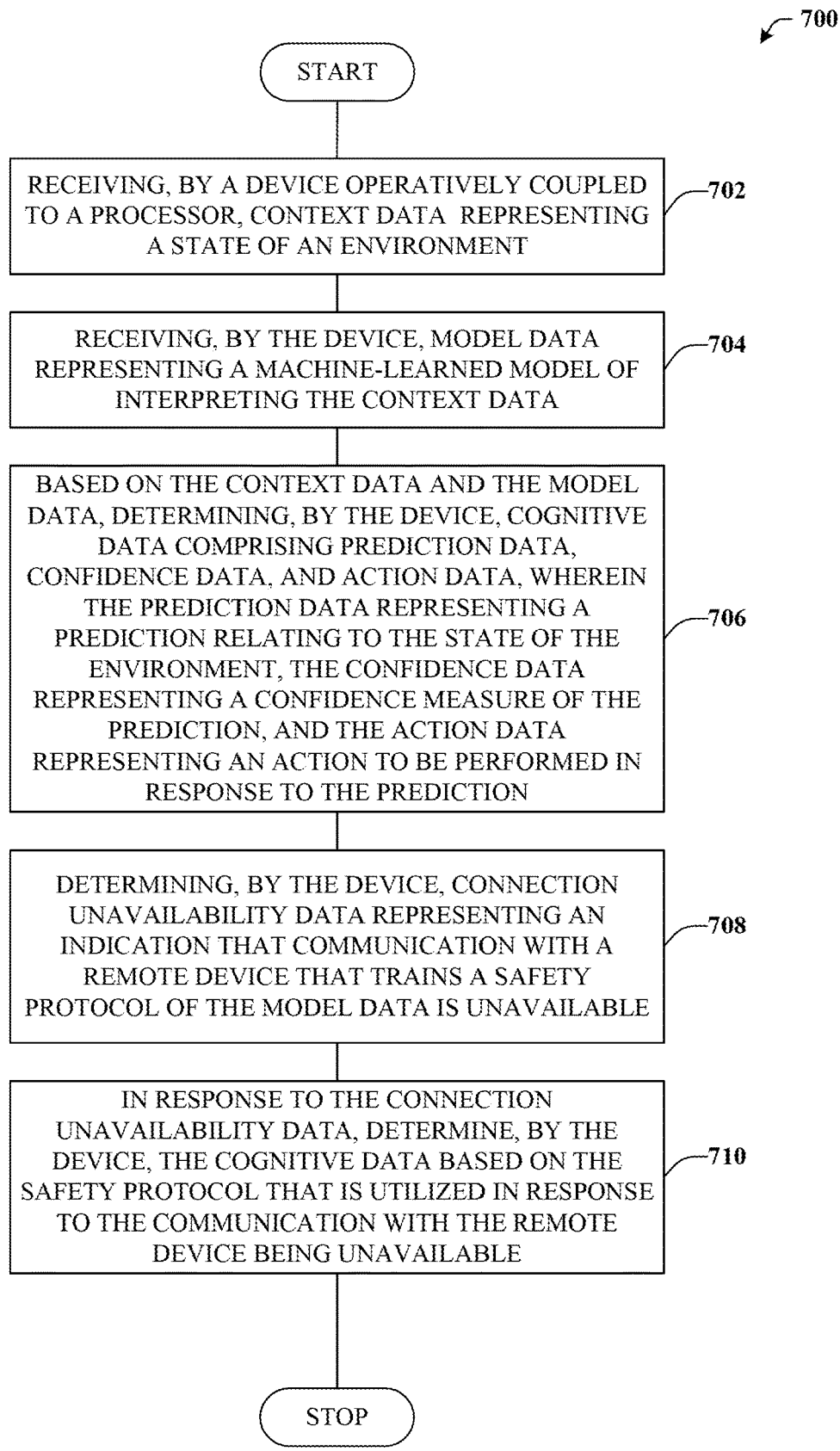
FIG. 7 illustrates a flow diagram of an example, non-limiting computer-implemented method that can provide for implementing or triggering a safety protocol in connection with the machine-learned model in accordance with one or more embodiments described herein.

FIG. 7 illustrates a flow diagram of an example, non-limiting computer-implemented method that can provide for implementing or triggering a safety protocol in connection with the machine-learned model in accordance with one or more embodiments described herein. Repetitive description of like elements employed in other embodiments described herein is omitted for sake of brevity. At reference numeral 702, a device such as mobile device 108 that is operatively coupled to a processor can receive context data representing a state of an environment. In some embodiments, the context data can be received from a sensor device that monitors the environment. In some embodiments, the device can generate the context data from sensor data received from the sensor device.

At reference numeral 704, the device can received model data representing a machine-learned model of interpreting the context data. In some embodiments, the model data can be received from a remote device such as a server that is communicatively coupled to the device.

At reference numeral 706, the device can determine cognitive data. The cognitive data can be determined based on the context data received at reference numeral 702 and based on the model data received at reference numeral 704. The context data can comprise prediction data, confidence data, and action data. In some embodiments, the prediction data can represent a prediction relating to the state of the environment. In some embodiments, the confidence data can represent a confidence measure of the prediction. In some embodiments, the action data can represent a defined action to be performed in response to the prediction. In some embodiments, cognitive data can further comprise severity data that represents a severity measure associated with the defined action.

At reference numeral 708, the device can determine connection unavailability data representing an indication that communication with a remote device that trains a safety protocol of the model is unavailable. It is understood that under ideal circumstances, a substantially persistent connection with the remote device can be maintained. However, in some cases, communication with the remote device can be lost, e.g., due to weather conditions, network conditions, or any other reason. Since the device can include model data that is received while communication with the remote device or other mobile devices is available, in some embodiments, execution of the model to interpret context data is not dependent on a connection with the remote device that trains the model. However, although not dependent on communication with the remote device in some embodiments, unavailability of the remote device can trigger use of the safety protocol, as detailed in connection with reference numeral 710.

At reference numeral 710, in response to the connection unavailability data, the device can determine the cognitive data (e.g., a prediction, confidence, action, and/or severity) based on the safety protocol that is utilized in response to the communication with the remote device being unavailable.

Figure 8:
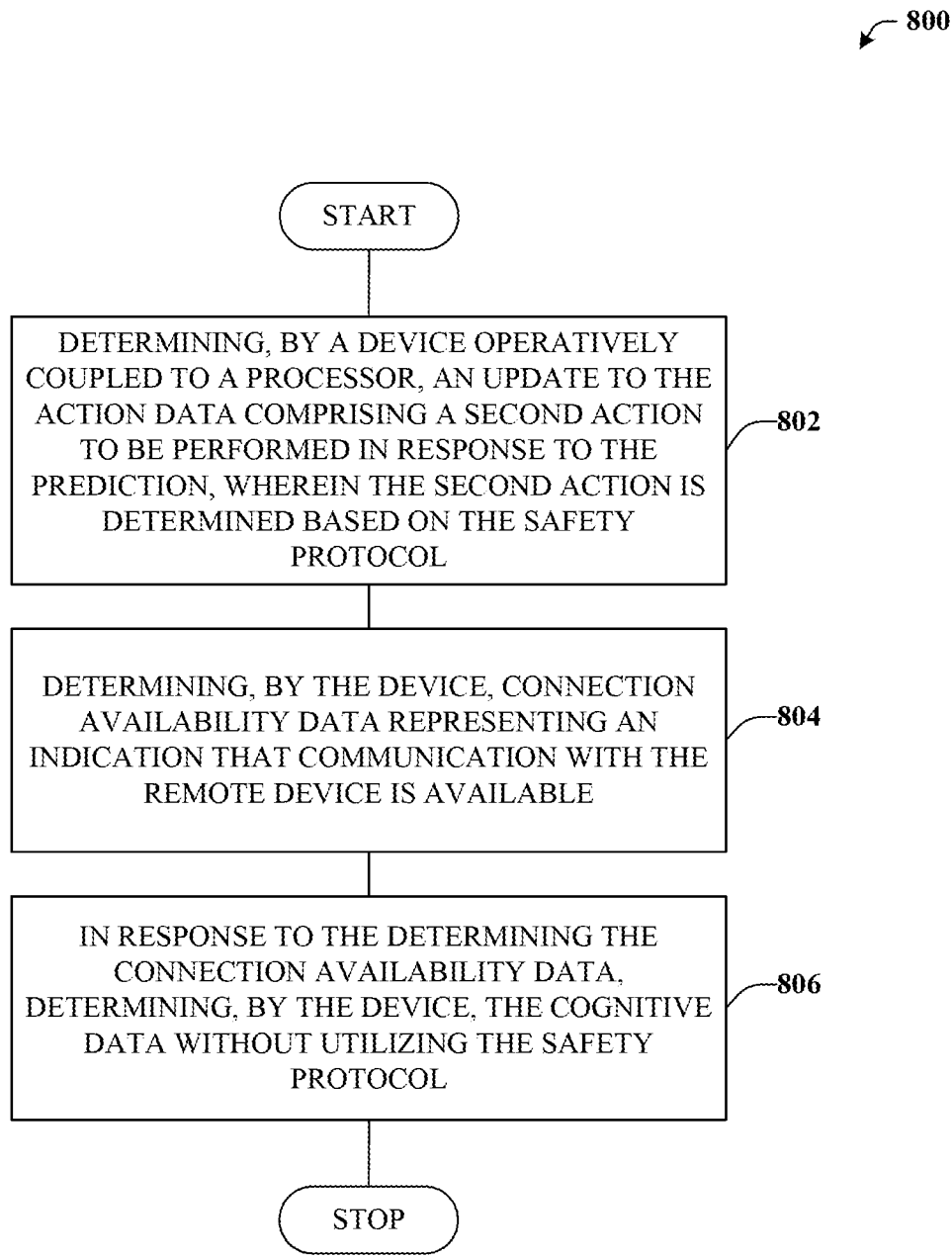
FIG. 8 illustrates a flow diagram of an example, non-limiting computer-implemented method that can provide for additional aspects or elements for implementing a safety protocol in connection with the machine-learned model in accordance with one or more embodiments described herein.

Turning now to FIG. 8, illustrated is a flow diagram of an example, non-limiting computer-implemented method that can provide for additional aspects or elements for implementing a safety protocol in connection with the machine-learned model in accordance with one or more embodiments described herein. Repetitive description of like elements employed in other embodiments described herein is omitted for sake of brevity. At reference numeral 802, the device can determine an update to the action data. This update to the action data can comprise a second action to be performed in response to the prediction, wherein the second action is determined based on the safety protocol. For instance, the first action can be deemed too risky, too expensive, or otherwise unsuitable without confirmation from the remote device (which is presently unavailable). Hence, the second action can be determined to be less risky, less expensive, or otherwise more suitable without confirmation. In some embodiments, the second action can be determined to enhance the context data in some way such as to gather more information, increase the confidence or the like.

At reference numeral 804, the device can determine connection availability data representing an indication that communication with the remote device is available. At reference numeral 806, in response to the determining the connection availability data, the device can determine the cognitive data without utilizing the safety protocol. In other words, once communication with the remote device is restored, the device can return to determining cognitive data based on the model, exclusive of the safety protocol.

Figure 9:
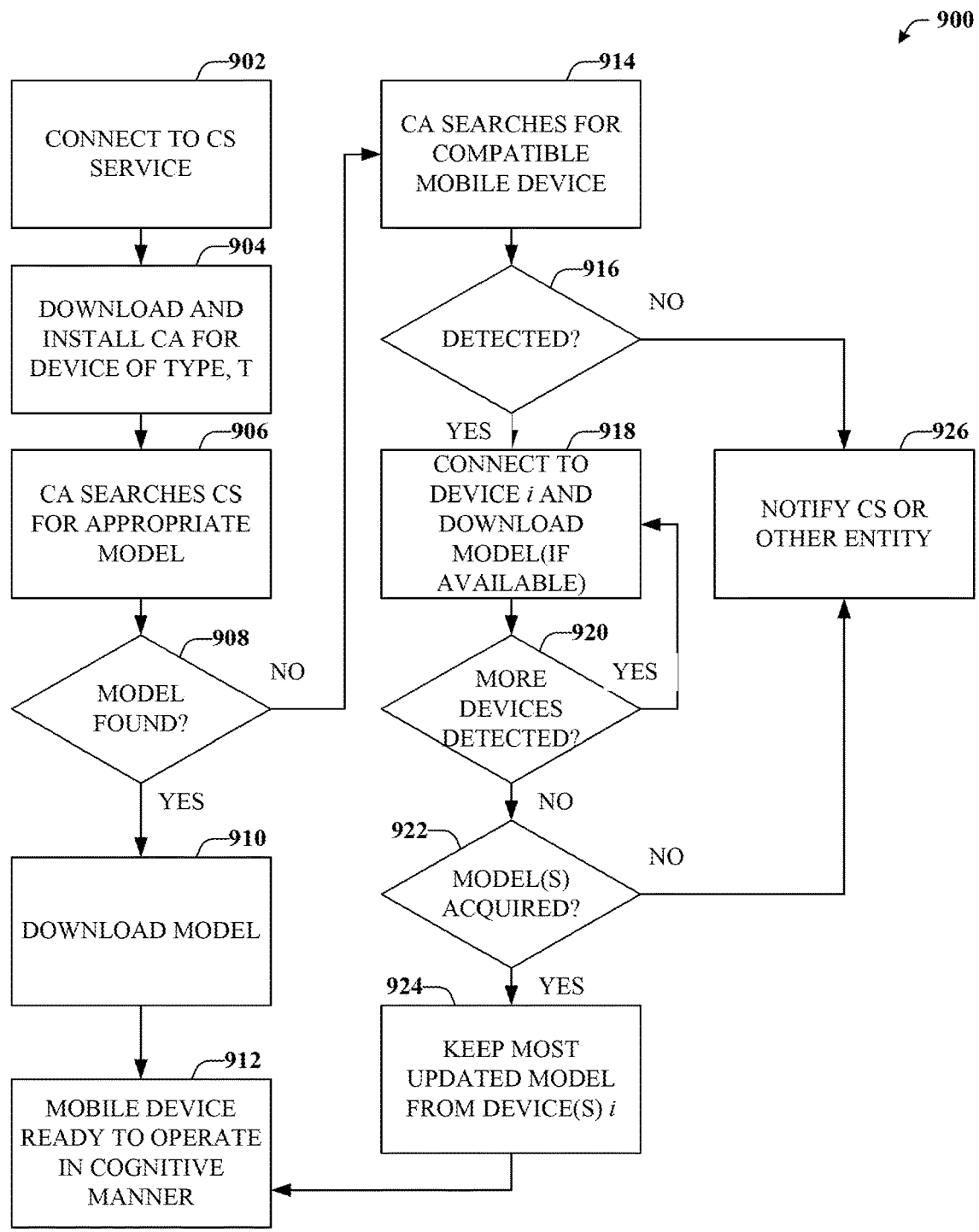
FIG. 9 illustrates a flow diagram of an example, non-limiting computer-implemented method that can provide for initialization of a mobile device with respect to utilizing an appropriate model, in accordance with one or more embodiments described herein.

Turning now to FIG. 9, illustrated is a flow diagram of an example, non-limiting computer-implemented method that can provide for initialization of a mobile device with respect to utilizing an appropriate model (referred to as "inception of cognition") in accordance with one or more embodiments described herein. Repetitive description of like elements employed in other embodiments described herein is omitted for sake of brevity. It is understood that the device (e.g., mobile device 108) performing the acts of method 900 can be activated and connected to a network such as the Internet or another wide area network. The mobile device can be of type, T. As one example, a mobile device of type T can be a quadcopter-like UAV or similar. At reference numeral 902, the mobile device can connect to a cognitive server (CS) service and/or an associated device such as server 102. The device can search for an appropriate CA, which can be a lightweight application that is suitable for devices of type T, which can be represented by device type 314.

At reference numeral 904, the device can download and install the CA that is appropriate for devices of type T. At reference numeral 906, the CA can search devices of the CS for an appropriate cognitive model. At reference numeral 908, if a suitable cognitive model is found, then method 900 can proceed to reference numeral 910. At reference numeral 910, the appropriate cognitive model can be downloaded to the device and, at reference numeral 912, having secured a cognitive model for interpreting context data collected at the mobile device, the mobile device is ready to operate in a cognitive manner. In some embodiments, such can mean the device is ready to interpret context data to facilitate machine-based cognitive reasoning or inferences or the like.

If at reference numeral 908, a suitable model is not found via the CS, method 900 can proceed to reference numeral 914. At reference numeral 914, the CA can search for compatible mobile device. In some embodiments, such as search can be conducted of devices that are nearby. Compatible devices can include other devices of type T as well as devices of different types that are determined to make use of the same or similar cognitive models. At reference numeral 916, if no compatible device(s) are detected, then method 900 can proceed to reference numeral 926, which in some embodiments can indicate the mobile device, having no suitable cognitive model, is not ready to operate in a cognitive manner. At reference numeral 926, the CS or another entity can be notified or another suitable operation can be performed.

On the other hand, if at reference numeral 916, compatible device(s) are detected, so method 900 can proceed to reference numeral 918. At reference numeral 918, the device can connect to device i, where i represents a count of the number of devices detected, and download a suitable cognitive model if available. At reference numeral 920, a decision can be made as to whether more detected devices remain. If so, i can be incremented and method 900 can return to reference numeral 918 to download a model being used by the next detected compatible device. In some embodiments, once all detected compatible devices have been processed, method 900 can proceed to reference numeral 922.

At reference numeral 922, if no model(s) were acquired in accordance with at reference numeral 918, then method 900 can proceed to reference numeral 926. Otherwise, if model(s) were acquired, then at reference numeral 924 the device can select for use the most updated model from device(s) i. In some embodiments, other models such as models that are not the most updated model can be discarded. Method 900 can proceed to reference numeral 912.

Figure 10:
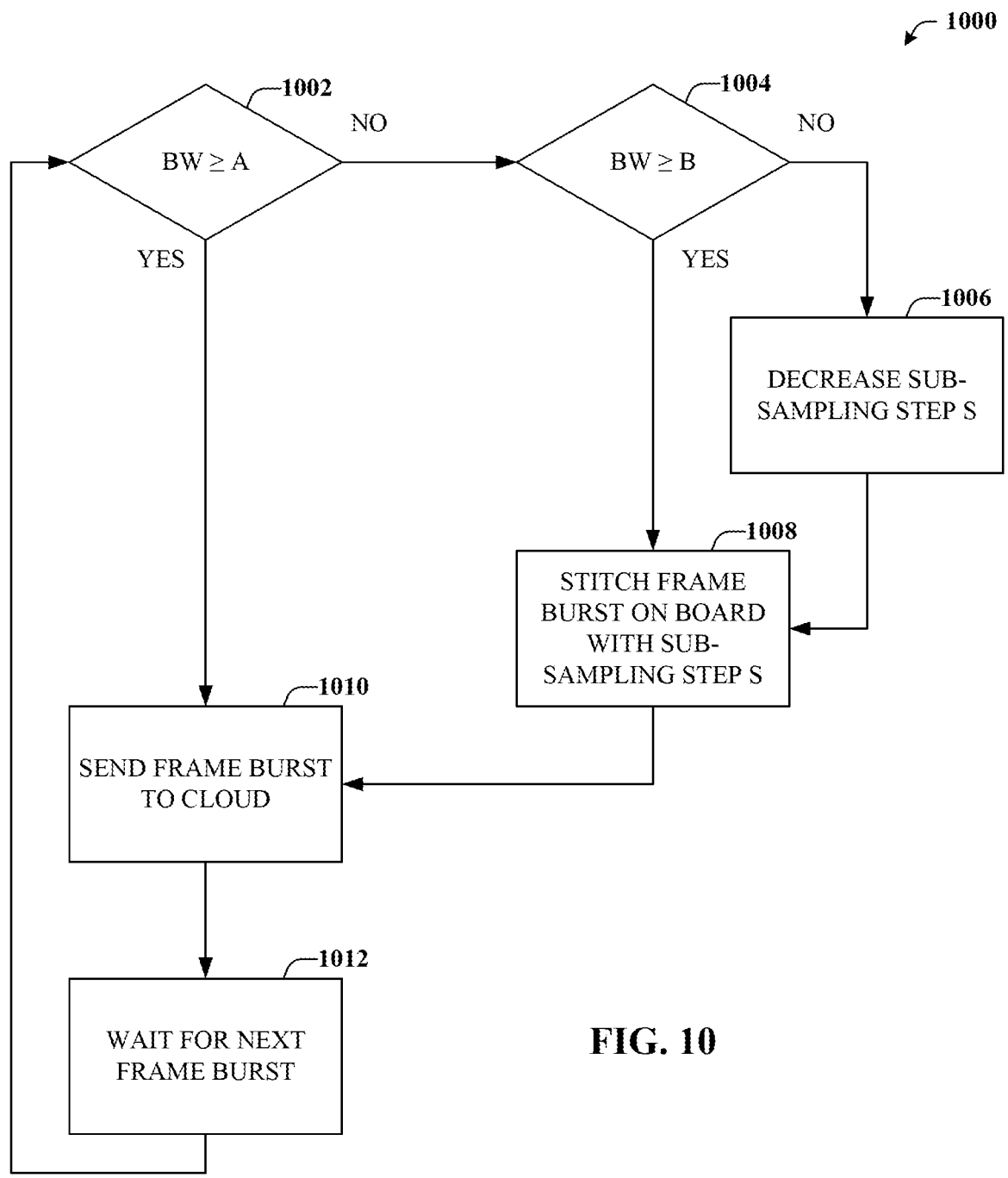
FIG. 10 illustrates a flow diagram of an example, non-limiting computer-implemented method that can provide for summarizing context data as a function of bandwidth in accordance with one or more embodiments described herein.

Referring now to FIG. 10, illustrated is a flow diagram of an example, non-limiting computer-implemented method that can provide for summarizing context data as a function of bandwidth in accordance with one or more embodiments described herein. Repetitive description of like elements employed in other embodiments described herein is omitted for sake of brevity. It is understood that the device such as mobile device 108 performing the acts of method 1000 can be activated and connected to a network such as the Internet or another wide area network and can have a suitable CA installed and running. In some embodiments, the mobile device can have an on-board video camera, which can represent an example of sensor device 306, that provides frames at a rate of A frames per second (fps). In some embodiments, the mobile device executes a video summarization algorithm on-board and sends mini-panoramas to the CS based on bandwidth availability. In some embodiments, frame bursts transmitted to the CS can represent context data 204, which can be substantially all sensor data 308 or represent a summary of sensor data 308 or context data 204.

At reference numeral 1002, the device can determine whether a measure of bandwidth (BW) that is available to transmit frame bursts to the CS is greater than or equal to A.

If not, then at reference numeral 1004, the device can determine whether BW is greater than or equal to B, where B can represent a mini-panorama fps that is less than the fps of A. In this regard, B can employ a sub-sampling step, S, that can be used to reduce the fps based on a summarization algorithm. If B is greater than BW, then, at reference numeral 1006, sub-sampling step, S, can be reduced. In some embodiments, S can be reduced sufficiently such that some fps, C, produced by the reduced S, requires less bandwidth than BW.

At reference numeral 1008, the device can stitch a frame burst such as data sent to CS based on sub-sampling step S. It is understood that sub-sampling step S can be based on a value of S as indicated at reference numeral 1004 or a reduced S value as indicated at reference numeral 1006. For example, whichever value of S that is appropriate for a determined measure of BW can be utilized. At reference numeral 1010, the frame burst can be transmitted to the CS. This frame burst can include raw data when BW is greater than or equal to A, can be a mini-panorama with a first sub-sampling rate when BW is less than A but greater than or equal to B, or can be a mini-panorama with a second sub-sampling rate when BW is less than B. At reference numeral 1012, the device can wait for a next frame burst and/or can proceed to reference numeral 1002.

Figure 11:
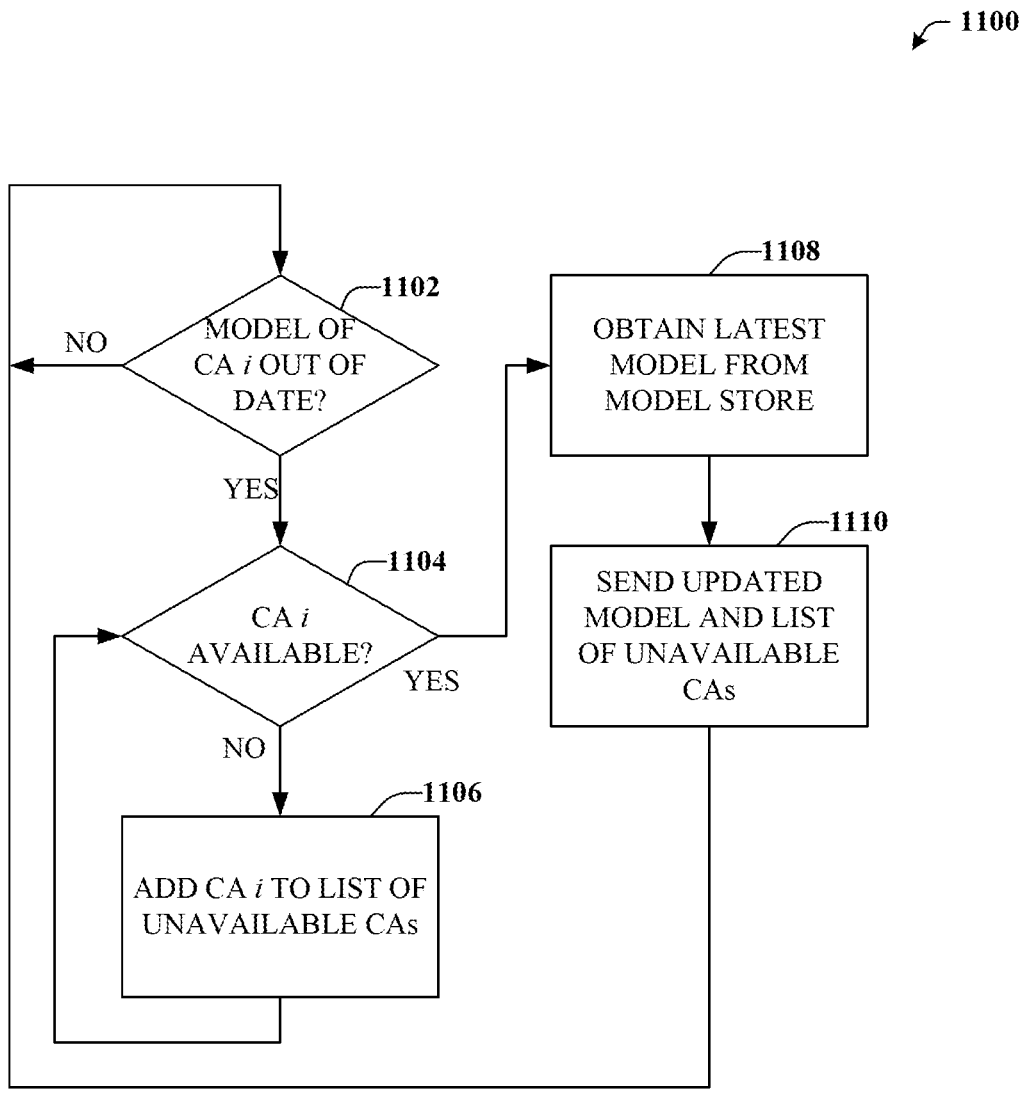
FIG. 11 illustrates a flow diagram of an example, non-limiting computer-implemented method that can provide for cloud-based socialization in connection with cognitive model updates in accordance with one or more embodiments described herein.

Turning now to FIG. 11, illustrated is a flow diagram of an example, non-limiting computer-implemented method that can provide for cloud-based socialization in connection with cognitive model updates in accordance with one or more embodiments described herein. Repetitive description of like elements employed in other embodiments described herein is omitted for sake of brevity. It is understood that the device (e.g., server 102) performing the acts of method 1100 can maintain a list of registered CAs and/or mobile devices. Registered CAs can be cognitive agent devices (e.g., mobile devices 108) that utilize the CS and/or substantially rely on the CS to train the model. It is understood that all or a portion of registered CAs might be communicatively coupled to the CS at a particular time or might have no connectivity with the CS at that particular time.

At reference numeral 1102, the device can make a determination as to whether a model for CA i (e.g., a particular CA) is out of date. If not, method 1100 can loop back to reference numeral 1102, in some cases after a defined period. If it is determined that the model for CA i is out of date, then, at reference numeral 1104, the device can make a determination as to whether CA i is available, e.g., in terms of present connectivity or another availability parameter. If CA i is not available, then at reference numeral 1106, CA i can be added to a list of unavailable CAs. The list of unavailable CAs can be a subset of the registered CAs, e.g., those registered CAs that are determined to be unavailable at a given time or period of time.

On the other hand, if at reference numeral 1104 it is determined that CA i is available, then method 1100 can proceed to reference numeral 1108. At reference numeral 1108, the device can obtain the latest cognitive model, for instance from a model store (e.g., model store 210). At reference numeral 1110, the device can send the updated and/or latest cognitive model and the list of unavailable CAs to CA i. Method 1100 can terminate or return to reference numeral 1102, in some cases after waiting a defined period.

Figure 12:
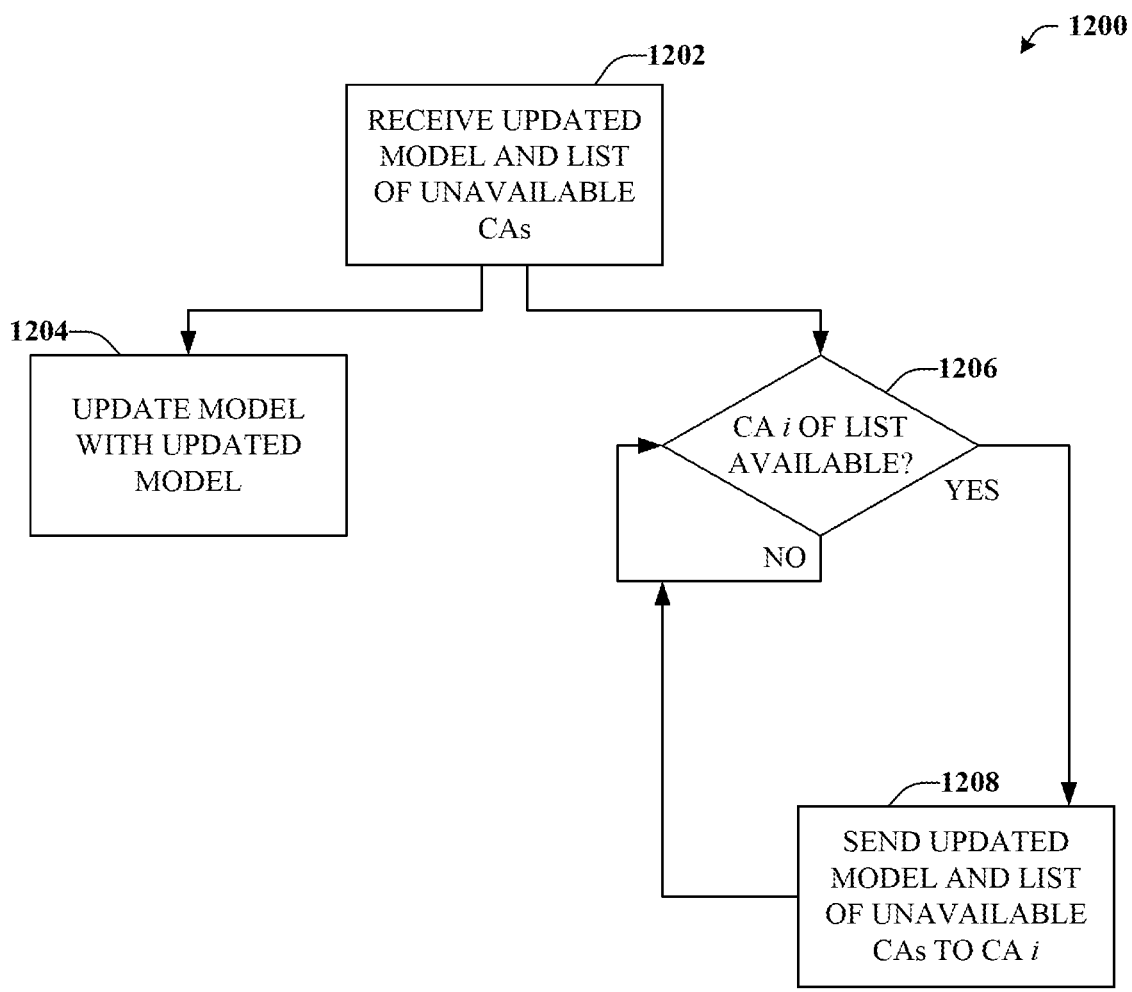
FIG. 12 illustrates a flow diagram of an example, non-limiting computer-implemented method that can provide for agent-based socialization in connection with cognitive model updates in accordance with one or more embodiments described herein.

Referring now to FIG. 12, illustrated is a flow diagram of an example, non-limiting computer-implemented method that can provide for agent-based socialization in connection with cognitive model updates in accordance with one or more embodiments described herein. Repetitive description of like elements employed in other embodiments described herein is omitted for sake of brevity. It is understood that the device (e.g., mobile device 108) performing the acts of method 1200 can be activated and connected to a network such as the Internet or another wide area network and can have a suitable CA installed and running. At reference numeral 1202, the device can receive an updated cognitive model and a list of unavailable CAs. It is understood that receipt of the updated cognitive model and the list of unavailable CAs can be from a server of the cloud (e.g., in response to reference numeral 1110 of FIG. 11) or from another mobile device (e.g., in response to reference numeral 1208, detailed infra).

At reference numeral 1204, the device can update a current cognitive model that is determined to be outdated with the updated cognitive model received at reference numeral 1202. In some embodiments, method 1200 can branch to reference numeral 1206, from either reference numeral 1202 or reference numeral 1204. At reference numeral 1206, the device can determine whether any CA i of the list of unavailable CAs is available to the device. In other words, even though CA i might not have connectivity with the CS (and thus be placed on the unavailability list), CA i might have connectivity with the device/CA. If not, then method 1200 can loop back to reference numeral 1206, in some embodiments after waiting a defined period. If so, then method 1200 can proceed to reference numeral 1208. At reference numeral 1208 the device can send the updated cognitive model and the list of unavailable CAs to CA i.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 13:
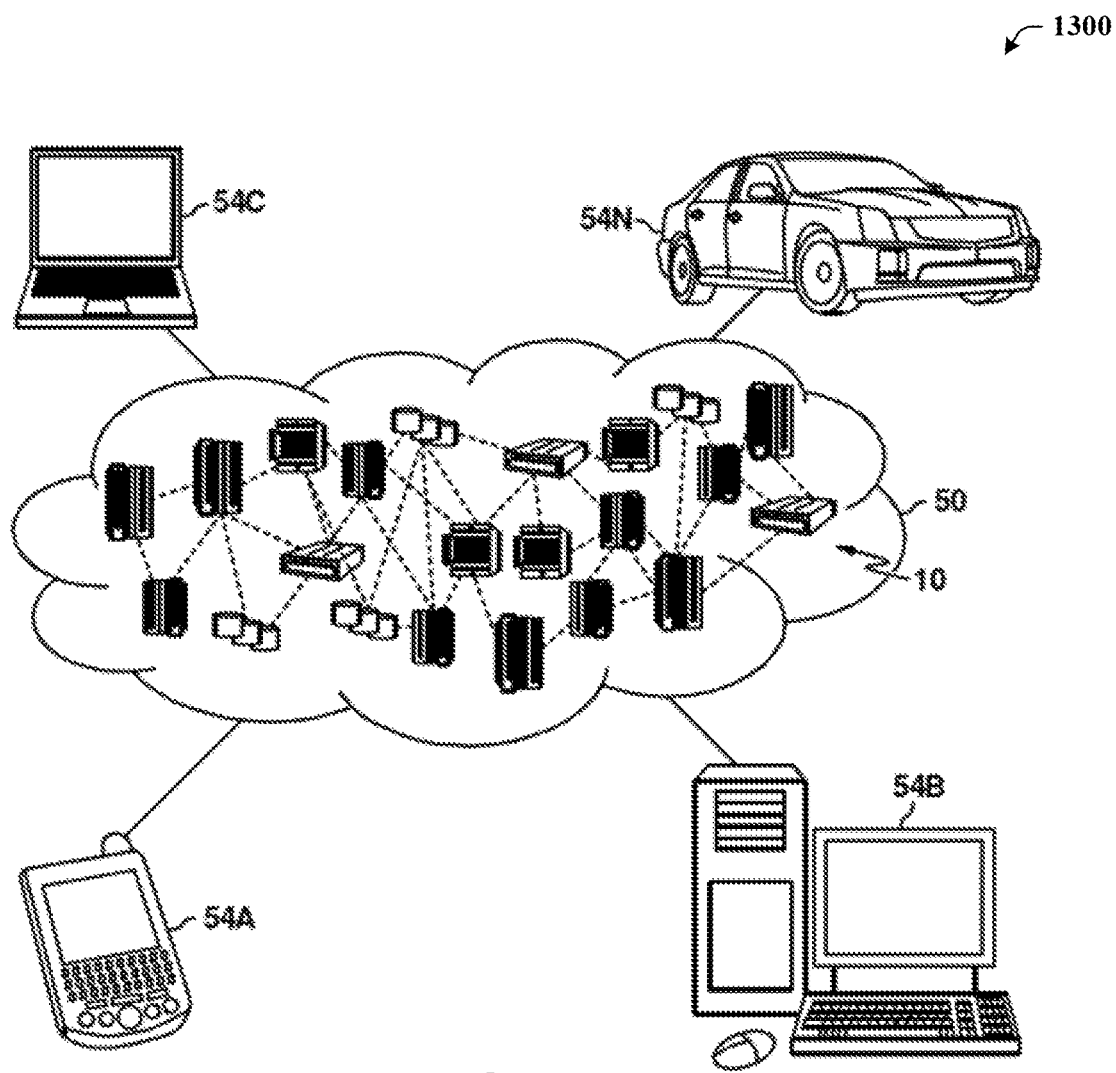
FIG. 13 depicts a cloud-computing environment in accordance with one or more embodiments described herein.

FIG. 13 illustrates system 1300, which depicts a cloud computing environment in accordance with one or more embodiments described herein. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Computing nodes 10 can communicate with one another. They can be grouped (not shown)

physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
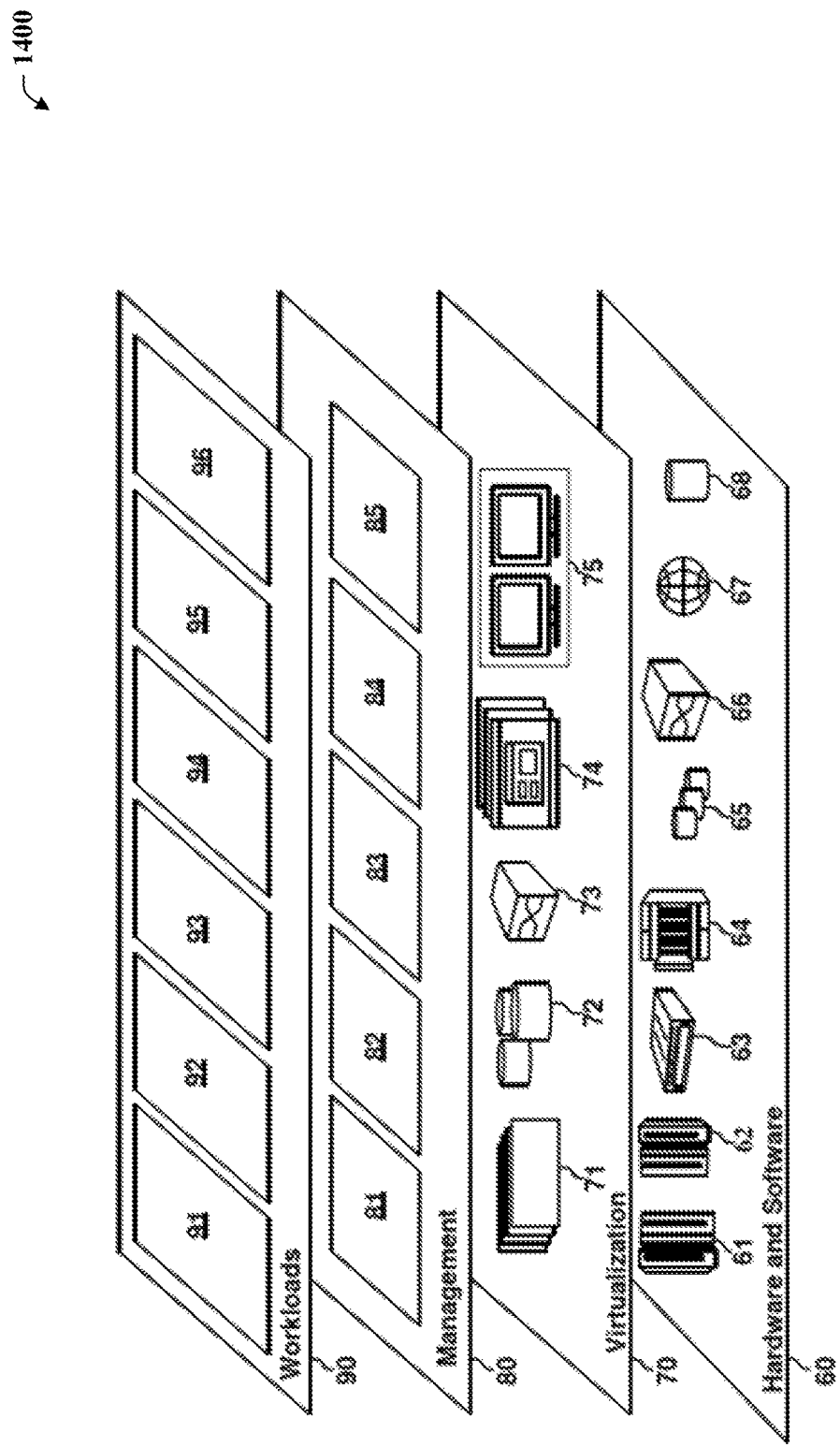
FIG. 14 depicts abstraction model layers in accordance with one or more embodiments described herein.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and cognitive cloud component 96 that can, e.g., be employed to train a model (e.g., model data 206) for interpreting context data (e.g., context data 204) based on machine-learning techniques. In some embodiments, cognitive cloud component 96 can be similar to cognitive server component 104 of FIG. 1.

In connection with FIG. 15, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 15:
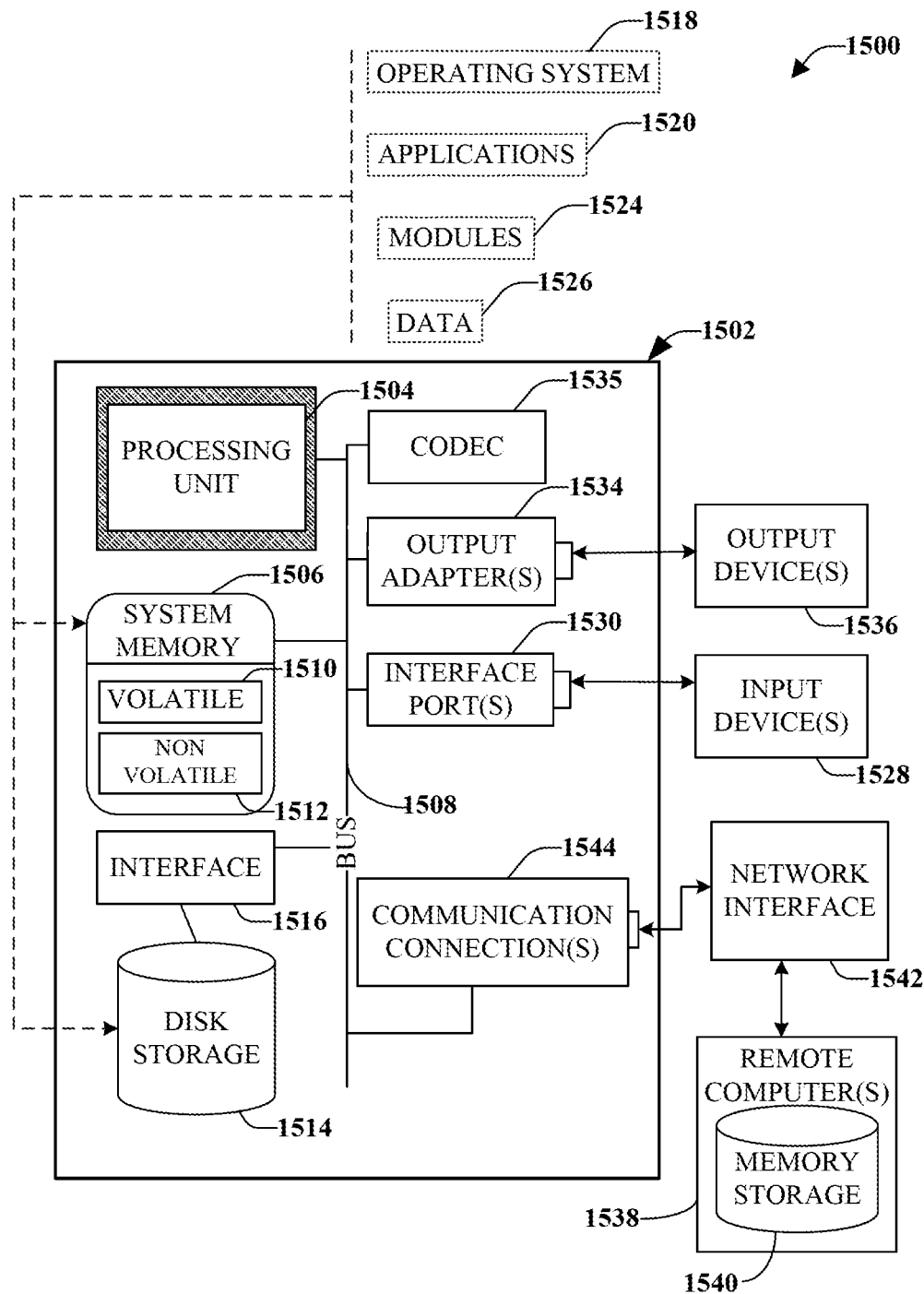
FIG. 15 illustrates a block diagram of an example, non-limiting operating environment in which one or more embodiments described herein can be facilitated.

With reference to FIG. 15, an example environment 1500 for implementing various aspects of the claimed subject matter includes a computer 1502. The computer 1502 includes a processing unit 1504, a system memory 1506, a codec 1535, and a system bus 1508. The system bus 1508 couples system components including, but not limited to, the system memory 1506 to the processing unit 1504. The processing unit 1504 can be any of various available processors. Dual microprocessors and other multiprocessor architectures also can be employed as the processing unit 1504.

The system bus 1508 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1506 includes volatile memory 1510 and non-volatile memory 1512, which can employ one or more of the disclosed memory architectures, in various embodiments. The basic input/output system (BIOS), containing the basic routines to transfer information between elements within the computer 1502, such as during start-up, is stored in non-volatile memory 1512. In addition, according to present innovations, codec 1535 can include at least one of an encoder or decoder, wherein the at least one of an encoder or decoder can consist of hardware, software, or a combination of hardware and software. Although, codec 1535 is depicted as a separate component, codec 1535 can be contained within non-volatile memory 1512. By way of illustration, and not limitation, non-volatile memory 1512 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1512 can employ one or more of the disclosed memory devices, in at least some embodiments. Moreover, non-volatile memory 1512 can be computer memory (e.g., physically integrated with computer 1502 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1510 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1502 can also include removable/non-removable, volatile/non-volatile computer storage medium. FIG.

15 illustrates, for example, disk storage 1514. Disk storage 1514 includes, but is not limited to, devices like a magnetic disk drive, solid state disk (SSD), flash memory card, or memory stick. In addition, disk storage 1514 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1514 to the system bus 1508, a removable or non-removable interface is typically used, such as interface 1516. It is appreciated that storage devices 1514 can store information related to a user. Such information might be stored at or provided to a server or to an application running on a user device. In one embodiment, the user can be notified (e.g., by way of output device(s) 1536) of the types of information that are stored to disk storage 1514 or transmitted to the server or application. The user can be provided the opportunity to opt-in or opt-out of having such information collected or shared with the server or application (e.g., by way of input from input device(s) 1528).

It is to be appreciated that FIG. 15 describes software that acts as an intermediary between users and the basic computer resources described in the suitable operating environment 1500. Such software includes an operating system 1518. Operating system 1518, which can be stored on disk storage 1514, acts to control and allocate resources of the computer system 1502. Applications 1520 take advantage of the management of resources by operating system 1518 through program modules 1524, and program data 1526, such as the boot/shutdown transaction table and the like, stored either in system memory 1506 or on disk storage 1514. It is to be appreciated that the claimed subject matter can be implemented with various operating systems or combinations of operating systems.

A user enters commands or information into the computer 1502 through input device(s) 1528. Input devices 1528 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1504 through the system bus 1508 via interface port(s) 1530. Interface port(s) 1530 include, for example, a serial port, a parallel port, a game port, and a universal serial bus (USB). Output device(s) 1536 use some of the same type of ports as input device(s) 1528. Thus, for example, a USB port can be used to provide input to computer 1502 and to output information from computer 1502 to an output device 1536. Output adapter 1534 is provided to illustrate that there are some output devices 1536 like monitors, speakers, and printers, among other output devices 1536, which require special adapters. The output adapters 1534 include, by way of illustration and not limitation, video and sound cards that provide a means of connection between the output device 1536 and the system bus 1508. It should be noted that other devices or systems of devices provide both input and output capabilities such as remote computer(s) 1538.

Computer 1502 can operate in a networked environment using logical connections to one or more remote computers, such as remote computer(s) 1538. The remote computer(s) 1538 can be a personal computer, a server, a router, a network PC, a workstation, a microprocessor based appliance, a peer device, a smart phone, a tablet, or other network node, and typically includes many of the elements described relative to computer 1502. For purposes of brevity, only a memory storage device 1540 is illustrated with remote computer(s) 1538. Remote computer(s) 1538 is logically connected to computer 1502 through a network interface 1542 and then connected via communication connection(s) 1544. Network interface 1542 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1544 refers to the hardware/software employed to connect the network interface 1542 to the bus 1508. While communication connection 1544 is shown for illustrative clarity inside computer 1502, it can also be external to computer 1502. The hardware/software necessary for connection to the network interface 1542 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components;
   a processor that executes computer executable components stored in the memory, wherein the computer executable components comprise:
   a cognitive agent component that, based on context data that represents a state of an environment and based on model data indicative of a machine-learned model of interpreting the context data, determines cognitive data comprising prediction data and action data, wherein the prediction data is indicative of a prediction relating to the state of the environment and the action data is indicative of a first action to be performed in response to the prediction;
   a communication component that determines failed connection data that indicates communication with a remote device is unavailable; and
   a safety component that instructs the cognitive agent component to utilize a safety protocol in response to a determination of the failed connection data.

2. The system of claim 1, wherein the cognitive agent component further updates the action data with a second action to be performed in response to the prediction, wherein the second action is determined based on the safety protocol.

3. The system of claim 1, wherein the cognitive agent component further determines confidence data indicative of a confidence measure of the prediction, wherein the cognitive data comprises the confidence data.

4. The system of claim 3, wherein the safety component instructs the cognitive agent component to utilize the safety protocol to determine the cognitive data in response to the determination of the failed connection data and further in response to a second determination that the confidence measure fails to meet a defined confidence threshold.

5. The system of claim 1, wherein the cognitive agent component further determines severity data indicative of a severity metric associated with the action, wherein the cognitive data comprises the severity data.

6. The system of claim 5, wherein the safety component instructs the cognitive agent component to utilize the safety protocol to determine the cognitive data in response to the determination of the failed connection data and further in response to a second determination that the determined severity fails to meet a defined severity threshold.

7. The system of claim 1, wherein the cognitive agent component updates the action data according to the safety protocol and determines a second action to be performed in response to the prediction, and wherein the second action is determined to provide additional context data employed to improve a confidence measure of the prediction.

8. The system of claim 1, wherein the cognitive agent component updates the action data according to the safety protocol and determines a second action to be performed in response to the prediction, wherein the first action is determined to have a first severity metric and the second action is determined to have a second severity metric, and wherein the first severity metric is greater than the second severity metric.

9. The system of claim 1, wherein the communication component further determines connection data that indicates communication with the remote device is available.

10. The system of claim 9, wherein the safety component, in response to determination of the connection data, instructs the cognitive agent component to generate the cognitive data without employing the safety protocol.

11. The system of claim 1, further comprising a sensor component that generates the context data in response to input received from the environment.

12. The system of claim 1, wherein the system is included in an unmanned vehicle.

13. A computer program product for interpreting context information, the computer program product comprising a computer readable storage medium having program instructions embodied therewith, the program instructions executable by a processor to cause the processor to:
determine, by the processor, cognitive data comprising prediction data that represents a prediction relating to the state of the environment and action data that represents a first action to be performed in response to the prediction, wherein determination of the cognitive data is based on context data that represents a state of an environment and based on model data that describes a machine-learned model of interpreting the context data, wherein the model comprises a safety protocol;
determine, by the processor, connection unavailability data that represents an indication that communication with a remote device that trains the model is unavailable; and
determine, by the processor, the cognitive data based on the safety protocol of the model data, wherein determination of the cognitive data based on the safety protocol is performed in response to determination of the connection unavailability data.

14. The computer program product of claim 13, wherein the program instructions are further executable to determine, by the processor, an update to the action data comprising a second action to be performed in response to the prediction, wherein the second action is determined based on the safety protocol.

15. The computer program product of claim 14, wherein the second action is determined to provide additional context data employed to improve a confidence measure of the prediction, wherein improvement of the confidence measure is based on analysis of the additional context data.

16. The computer program product of claim 14, wherein the first action is associated with a first severity metric representing a determined severity of the first action and the second action is associated with a second severity metric representing a determined severity of the second action, and wherein the second severity metric is less than the first severity metric.

17. A computer-implemented method, comprising:
determining, by a device operatively coupled to a processor, cognitive data comprising prediction data, confidence data, and action data, wherein the prediction data represents a prediction relating to a characteristic of an environment, wherein the confidence data represents a confidence measure of the prediction, wherein the action data represents an action to be performed in response to the prediction, and wherein the determining is based on context data and model data, the context data representing the characteristic of the environment and model data represents a machine-learned model of interpreting the context data;
determining, by the device, connection unavailability data representing an indication that communication with a remote device that trains a safety protocol of the model data is unavailable; and
in response to the determining the connection unavailability data, generating, by the device, the cognitive data based on the safety protocol.

18. The computer-implemented method of claim 17, further comprising determining, by the device, an update to the action data comprising a second action to be performed in response to the prediction, wherein the second action is determined based on the safety protocol.

19. The computer-implemented method of claim 17, further comprising determining, by the device, connection availability data representing an indication that communication with the remote device is available.

20. The computer-implemented method of claim 19, further comprising, in response to the determining the connection availability data, determining, by the device, the cognitive data based on the model data exclusive of the safety protocol.

* * * * *